May 23, 1961 W. TERHORST 2,985,494
SECTIONAL SYNTHETIC PLASTIC BEARING
Filed May 29, 1958
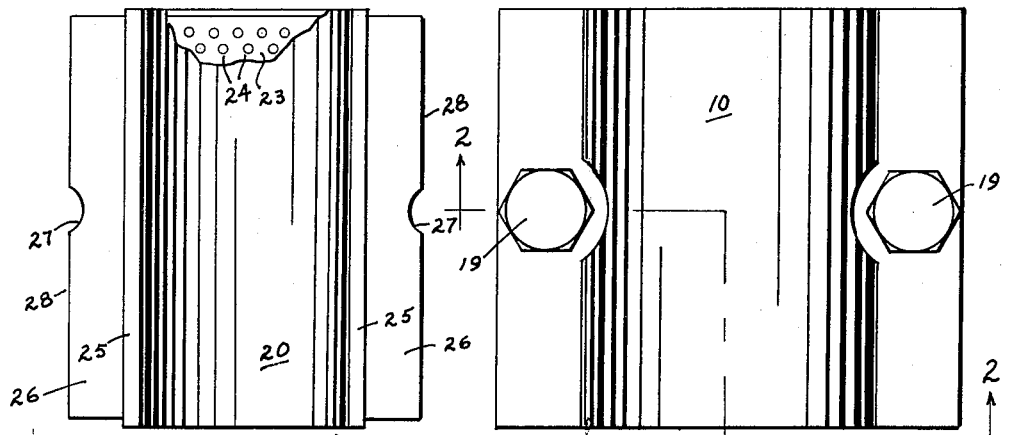
Fig.3  Fig.1
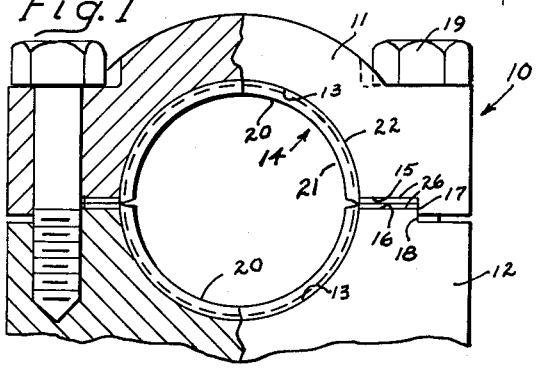
Fig.4
Fig.2
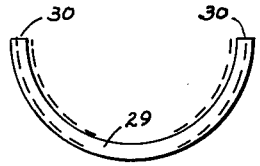
Fig.5
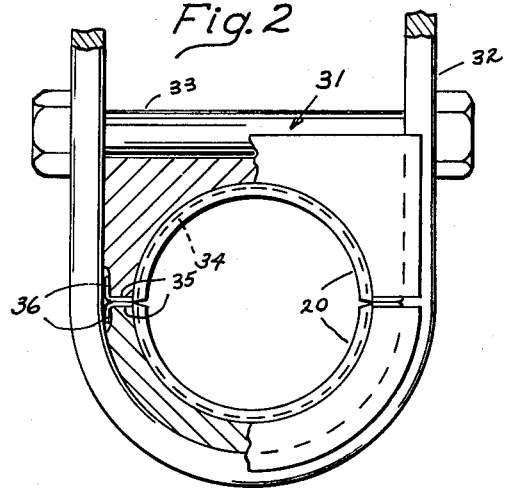
Fig.7  Fig.6
INVENTOR
WILLIS TERHORST
BY
Frederick C. Meyers
ATTORNEY United States Patent Office 2,985,494
Patented May 23, 1961

2,985,494
SECTIONAL SYNTHETIC PLASTIC BEARING
Willis Terhorst, Minot, N. Dak.
Filed May 29, 1958, Ser. No. 738,746
6 Claims. (Cl. 308—238)

This invention relates to bearings, and more particularly to split or sectional-type bearings utilizing synthetic plastic material.

In my co-pending application, Serial No. 738,740 filed of even date herewith, I have pointed out some of the advantages and disadvantages of such plastic materials as the synthetic polyamides known to the trade as "nylon" when used as bearing material. In cylindrical sleeve shapes, the nylon shrinks upon warming and cooling within its retainer. The result is a loosening of the fit of the bearing in its retainer and its outer dimension and a tightening of the inner dimension to the point where the bearing may seize against its shaft. The cylindrical bearing, because of its symmetry, will shrink uniformly without twisting or warping. Thus, by uniformly stressing the bearing to restrain its shrinking by means of a special metallic sheath, the bearing may be kept in substantially precise dimension while at the same time preserving its press-fit within the container and improving its heat dissipation. Synthetic plastic bearings of small dimension are used extensively and with excellent results.

Where it is attempted to use split or sectional bearings made of synthetic resins such as nylon and Teflon, which are products of E. I. du Pont de Nemours and Company, the dimensional instability of the bearing becomes a problem, particularly in the larger sizes and at temperature ranges which foster shrinkage. In such case, however, the shrinkage is not uniform and, hence, a warping may occur which causes uneven wear upon both the shaft and bearing. Furthermore, the warpage produces frictional heat which, in turn, further aggravates the warpage and distortion upon cooling.

Because of the toughness of the plastic material and its ability to be easily lubricated by either water or oil, it becomes desirable to use such bearings which are subject to abrasive conditions, particularly for shafts of a larger diameter than customarily utilized in sleeve or pillow-block bearings. Thus, such bearings, in the absence of distortion, substitute admirably for wooden bearings, cast-iron and bronze bearing blocks.

The present invention contemplates the use of synthetic plastic materials in sectional bearings, and has a general object thereof the provision of a structure which will maintain the advantages of wear and easy lubrication and gain the benefits of dimensional stability.

More specifically, it is an object of the invention to provide a sectional bearing of synthetic plastic material ordinarily subject to warpage and shrinkage under stress and temperature changes, wherein structural means are supplied which will overcome both effects.

A further objective of the invention is to provide a sectional bearing of the class described which is economical in manufacture and use and may be employed as a liner or shell in conjunction with a clamping structure such as a pillow block.

These and other objects and advantages of my invention will more fully appear from the following description, made in connection with the accompanying drawing, wherein like reference characters refer to the same parts throughout the several views and in which:

Figure 1 is a top view of my bearing assemblage;
Figure 2 is a side elevation shown partially cut away in vertical section on the line 2—2 of Figure 1;
Figure 3 is a top view of the lower section of my bearing shell;
Figure 4 is an end view of the bearing shell;
Figure 5 is an end view of a half-shell bearing construction made of synthetic plastic material alone, the dotted line representing the warped portion thereof;
Figure 6 shows an alternate form of the invention employing restraining means suitable for a strap type clamp; and
Figure 7 is another form of the invention showing a still further arrangement of the restraining flanges.

With continued reference to the drawing, my sectional bearing assembly is shown in Figs. 1 and 2. The assembly constitutes a shell retainer indicated generally at 10 which, in turn, comprises mating members 11 and 12 which together define a backing surface 13 for retaining the sectional bearing shell which is shown generally at 14. The mating members 11 and 12 are further provided with abutting side surfaces 15 and 16, respectively. These abutting surfaces may be off-set at 17 and 18, respectively, to maintain the mating members 11 and 12 in alignment. Clamping means such as the stud bolts 19 may be employed in the conventional manner to draw the mating members 11 and 12 together for purposes of clamping the shell in operative position. The shell retainer 10 is similar to an ordinary pillow block but is provided with a spaced clearance between abutting surfaces 15 and 16 for a purpose to be subsequently disclosed.

The shell 14 consists of a plurality of hollow cylindrical segments 20 which are made from a synthetic plastic material such as nylon or Teflon, commonly used in small bearing structures and subject to the problem of shrinking and distorting, as previously mentioned. The cylindrical segments 20 have a common bearing surface 21 and an outer surface 22 which is adapted to be firmly clamped within the shell retainer 10, as described. My invention contemplates the use of plastic shells which can vary over a considerable range of thicknesses.

Embedded at least partially within each of the cylindrical plastic segments 20 is a metallic element 23, as shown in Figure 3. This metallic element 23 is provided with a multiplicity of apertures or openings 24 which permit the plastic material in each of the segments 20 to extend therethrough and firmly lock the segment against the metallic element. Thus, the bond which is effected between the metallic element and the plastic segment can be easily preserved. The metallic element 23 is of sufficient thickness to provide strength for the segment and may be embedded entirely within the segment or only partially, the remainder of the element being exposed at the external surface 22 so as to lie in intimate contact with the inner surface 13 of the shell retainer 10. The latter construction has particular advantages which are disclosed in my co-pending application, Serial No. 738,740.

Each of the hollow cylindrical segments 20 terminates in a pair of side edges 25 from which the metallic element 23 extends in a restraining flange 26 as shown in Figs. 2 and 3. The restraining flanges 26 are bent outwardly from the shell segment and are adapted to be placed in face-to-face relation as shown in Fig. 2. The thickness of opposed pairs of the flanges 26 is such as to fill the space between the opposed abutting surfaces 15 and 16 of the respective shell retainer mating members 11 and 12. Arcuate notches 27 may be placed in the flanges 26 at the outer edge 28 and so positioned as to engage stud bolt 19 at each side of the bearing assembly. When assembled as shown in Fig. 2, the cylindrical segments of the shell structure are thus not only firmly clamped against the inner surface of the shell retainer but are also clamped against endwise relative movement.

When the bearing assembly is put into use, the synthetic plastic segments will be pre-stressed with respect to the metallic elements, and the metallic elements will likewise be placed under stress because of the clamping force applied to the shell retainer. By reference to Fig. 5, consideration is given the behavior of a shell segment constructed of pure synthetic plastic material which is not properly restrained against shrinkage and warpage. During the warming cycle, such as created by the friction of a rotating shaft, the plastic segment 29, as shown in Fig. 5, will maintain its proper shape and good bearing characteristics unless excessive temperatures are reached. Now, however, when the plastic material cools, a "set" begins to take place which shrinks the entire diameter of the segment to a slight degree and, at the same time, causes the free ends 30 of the segment to draw inwardly to the dotted line position. When a shaft is operatively positioned within the segment of a bearing constructed of pure plastic material, the degree of distortion indicated is not actually attained because of the resistance of the shaft itself. However, such clearances as may be allowed or required between the bearing and its shaft will be taken up by the warpage and the shaft will soon drag and even seize in such bearing structure. As previously pointed out, the increased wear and friction creates a vicious circle which will soon destroy the bearing.

In contrast, my bearing structure acquires a maximum stressed value which is not cumulative in effect, but is relieved during each use of the bearing. The tendency of the plastic material to shrink and warp remains, but the restraining influence of the metallic element prevents shrinkage and the flanges prevent the inward warping effect which would normally take place in the absence of such restraining influence.

The application of my invention to an alternate form is shown in Fig. 6. Here the shell retainer is indicated generally at 31 and is adapted to be clamped by a U-shaped strap 32 and a cross bolt 33, as shown. The construction of the synthetic plastic segments 20 may remain the same but the metallic element 34 is of different construction, the outward free ends terminating in restraining flanges 35 whose outermost margins 36 are bent in opposed directions.

A still further form of my invention is shown in Fig. 7, wherein flange elements 37 are provided with bent outer margins 38 and 39, respectively, which overlap and provide an interlocking engagement to prevent the inward distortion of the segments 20 even though the mating members 40 and 41 be relieved of some of their clamping force since the outer margins 38 and 39 are hooked over the off-set portions 42 of member 41. In all cases, it is to be noted that the cylindrical plastic segments are restrained not only against shrinkage but against distortion, yet constitute economical and replaceable shell elements adapted for long usage and rapid replacement when finally worn.

It will, of course, be understood that various changes may be made in the form, details, arrangements and proportions of the parts without departing from the scope of my invention as set forth in the appended claims.

What I claim is:

1. A bearing section utilizing synthetic plastic material of the type normally subject to shrinkage and distortion under temperature change and pressure, said bearing section comprising, a hollow cylindrical segment constructed of synthetic plastic bearing material, and a metallic element embedded at least partially in the plastic segment, said metallic element having restraining flange portions extending outwardly beyond the cylindrical segment at the longitudinal edges thereof, the embedded portion of the metallic element being adapted to prevent shrinkage of the material and the retaining flange portion being adapted to prevent distortion thereof.

2. A bearing section utilizing synthetic plastic material of the type normally subject to shrinkage and distortion under temperature change and pressure, said bearing section comprising, a hollow cylindrical segment having longitudinal side edges in spaced parallel relation and constructed of synthetic plastic bearing material, and a metallic element embedded at least partially in the plastic segment, said metallic element having restraining flange portions extending along each longitudinal side edge and being bent outwardly beyond the cylindrical segment, the embedded portion of the metallic element being adapted to prevent shrinkage of the material and the retaining flange portions being adapted to prevent distortion thereof.

3. A bearing section utilizing synthetic plastic material of the type normally subject to shrinkage and distortion under temperature change and pressure, said bearing section comprising, a hollow cylindrical segment constructed of synthetic plastic bearing material, and a metallic element embedded at least partially in the plastic segment and having a multiplicity of locking apertures formed therethrough, said metallic element having restraining flange portions extending outwardly beyond the cylindrical segment at the longitudinal edges thereof, the embedded portion of the metallic element being adapted to prevent shrinkage of the material and said retaining flanges being flat and lying substantially in a plane including the axis of the cylindrical segment whereby to prevent distortion of said plastic material.

4. A sectional bearing assembly which comprises, a plurality of hollow cylindrical segments constructed of synthetic plastic bearing material, a metallic element embedded at least partially in each of said cylindrical segments, said metallic element having restraining flange elements extending outwardly beyond the cylindrical segment at the longitudinal edges thereof, the embedded portion of the metallic element being adapted to prevent shrinkage of the material and the retaining flange portions being adapted to prevent distortion thereof, and a clamping retainer holding the segment together and rigidly clamping the restraining flanges against shifting.

5. A sectional bearing assembly which comprises, a shell retainer having mating members adapted to be clamped together, said mating members having abutting side edges, clamping means adapted to draw associated opposed abutting edges of said mating members together, a plurality of shells defining a cylindrical bore and constructed of synthetic plastic bearing material, a metallic element embedded at least partially in each of said shells, said metallic elements having restraining flange portions extending outwardly from the axis of the shells and lying between the abutting side edges of said mating members in rigidly clamped engagement whereby to prevent shrinkage and distortion of the plastic material.

6. The subject matter set forth in claim 5, and means interlocking the flange portions and shell retainer against endwise relative movement.

References Cited in the file of this patent
UNITED STATES PATENTS

| | | |
|---|---|---|
| 2,335,638 | Bogner | Nov. 30, 1943 |
| 2,622,949 | Cotchett | Dec. 23, 1952 |
| 2,702,730 | Ivanoff | Feb. 22, 1955 |